United States Patent [19]
Fitzhugh

[11] 3,797,738
[45] Mar. 19, 1974

[54] CONTROLLED WATER DISTRIBUTION SYSTEM AND METHODS

[76] Inventor: Davis Fitzhugh, Raspberry Ln., Augusta, Ark. 72006

[22] Filed: Nov. 2, 1972

[21] Appl. No.: 302,996

[52] U.S. Cl. .................... 239/1, 239/145, 239/542, 239/547
[51] Int. Cl. ........................ B05b 17/00, B44d 1/08
[58] Field of Search ........... 239/145, 542, 547, 450, 239/1

[56] References Cited
UNITED STATES PATENTS

| | | | |
|---|---|---|---|
| 2,798,768 | 7/1957 | Babin | 239/145 |
| 2,769,668 | 11/1956 | Richards | 239/145 |
| 2,904,809 | 9/1959 | Clayson | 239/547 X |
| 3,613,309 | 10/1971 | Coburn | 239/145 |

FOREIGN PATENTS OR APPLICATIONS

| | | | |
|---|---|---|---|
| 100,530 | 12/1964 | Denmark | 239/145 |

*Primary Examiner*—Lloyd L. King
*Attorney, Agent, or Firm*—Mandeville and Schweitzer

[57] ABSTRACT

Methods and apparatus are provided for sub-surface irrigation of areas of land of differing sizes, and in a manner in which small controlled amounts of water can be expelled more or less continuously into the soil over a relatively large area, along a supply line, for effective irrigation simultaneously with a substantial reduction in the total quantity of water used in comparison with prior arrangements for the same amount of land. The above is achieved by feeding through the supply line to one or more wick manifolds, which in turn continuously supply water distributors comprised essentially of a relatively hydrophillic substance which serve to absorb, hold and distribute the water supply in a slow, continuous manner to the soil being irrigated. In addition, provision is made for distributing a reasonably uniform quantity of water at a variety of points along the system, regardless of the terrain of the land being irrigated and in the absence of expensive land leveling procedures. The methods and apparatus herein are especially useful in relatively arid areas because the controlled distribution achieved limits the quantity of water needed for effective irrigation.

11 Claims, 5 Drawing Figures

CONTROLLED WATER DISTRIBUTION SYSTEM AND METHODS

This invention relates generally to drip-type irrigation of land. More particularly, this invention relates to methods and apparatus for drip irrigation of land, in which the water can be applied more or less continuously without undue regard to the degree of pressure applied from the water supply, with each small increment expelled along the supply line of water being substantially equal to every other increment, regardless of how close the position is from the source of supply of the water, and (within limits) without undue regard to the terrain of the land.

Drip irrigation has become increasingly popular in the last few years. The development has been more rapid recently because of the increasing shortage of water in many areas. Drip irrigation, as the name implies, applies very small quantities of water more or less continuously to the soil being irrigated, in contrast to the more conventional ditch type irrigation methods in which ditches are arranged along rows of plants to be watered and periodically flooded to feed the roots of plants adjacent to the ditches. Drip irrigation is particularly effective when it is applied below the soil surface, because much smaller quantities of water can be utilized for irrigating the same amount of land, and because it minimizes evaporation. This is particularly important in arid areas where evaporation takes place rapidly. Moreover, because there is significally reduced evaporation, excessive salt deposits do not accumulate in areas adjacent to the root structure of the plants being irrigated. This problem has necessitated, in the past, periodic flushing in order to remove the salt deposits.

As stated above, in drip irrigation, the water is applied in very small quantities more or less continuously. In this manner, the soil is kept in a "substantially moist" condition in a continuous manner so that water is constantly available for the roots of plants being irrigated. This is so, even though the surface appearance may look dry. As such, one advantage of drip irrigation over the more conventional ditch type is the fact that the soil adjacent to plants is more or less continuously dry on the surface, and, therefore, the planter or farmer can operate heavy duty servicing equipment such as, sprayers, along the rows of the plants without being mired in mud or without having to follow a particular schedule between the times when those areas would ordinarily be flooded in ditch irrigation. Moreover, with this comparatively dry condition of the soil adjacent to plants, manual pickers can go along the plants without the usual difficulties engendered if the soil is in a muddy condition.

A variety of different methods and apparatus have been utilized by drip irrigation, including the use of porous wall tubing, with the water outlets being located throughout the entire hose wall for continuous wetting, as long as the hose is supplied with water. Other developments include a variety of different kinds of valves or water emitters placed sequentially in spaced apart relation along the supply tube or hose, with these valves being arranged so as to emit water to the soil while simultaneously providing for anti-clogging of the valve orifice from dirt particles adjacent to the orifice.

Certain difficulties arise from these various prior arrangements, in that they all provide for substantially continuous feeding of the soil with water as long as the supply line is supplied with water. Thus, control of the amount of water desired for any particular plant involves control of the outlet orifice or of the various valves involved. Generally, therefore, these orifices are very small and within the range of .015 inches to .020 inches in diameter. Because of these very small orifices and because the valves connected to them are very small, there are substantial problems of clogging. As a result, most of the configurations of the various valves developed have to do with flushing them out and protecting them from such clogging characteristics.

However, with this kind of system utilizing some sort of valve control either at the outlet valves themselves or with some kind of sequential valve control in the main feed line for the system, there is still a continuous feeding of substantially uncontrolled amounts of water as long as the supply line is fed with water. That is, as long as the system is turned on, water is being fed continuously with control depending solely on the size of the orifice through which the water is fed to the soil and must be turned off either manually or by additional controls when the ground becomes saturated.

By contrast, and quite unexpectedly, it has now been found in accordance with this invention that controlled amounts of water can be fed to the soil in a manner whereby relatively uniform amounts of water will be fed to the soil at every outlet along the supply line with relatively limited regard for the terrain of the land being fed, and with greatly reduced fluctuations due to frictional effects. With the arrangement herein, the planter or farmer can provide a continuous supply of water utilizing ordinary water pressure in the lines available to him, with the water being fed in a continuous manner without having to be concerned with complicated valve controls either in the main supply line or in the individual outlets for the water supply. The water is distributed at the various outlets provided in an even, more or less continuous manner so as to maintain the environment of the root systems of the plants being fed, continuously moist but not flooded.

In its broadest sense, the above is achieved by introducing water into a supply line, distributing the water from the main supply line to a plurality of feeder lines as desired and depending upon the size and configuration of the area being irrigated. The various feeder lines each feed into a wick manifold, in accordance herewith, which is packed with a relatively hydrophobic fibrous material. This fibrous material serves to hold back and control the supply of water coming from its particular feeder line and to distribute it in a continuous manner in relatively small increments to a distributor arrangement. This distributor arrangement receives the water from the wick manifold and contains that water in a stored fashion and distributes it in an even manner at the distributor-soil interface so as to maintain the soil adjacent to the distributor continuously moist for irrigating that soil.

Accordingly, it is the object of this invention to provide methods and apparatus for the controlled metering of amounts of water expelled from each outlet of the systems in accordance herewith in a continuous manner and with substantially no complicated valving controls therefor. Other objects and advantages of this invention will be apparent from the following description, the accompanying drawings and the appended claims.

In the drawings:

Referring to the drawings in which like characters refer to like parts throughout several views thereof, FIG. 1 illustrates the invention as employed for irrigation of a plot of land with a supply line arranged in a conventional manner for reaching a substantially all areas of that plot of land.

Figure 1:
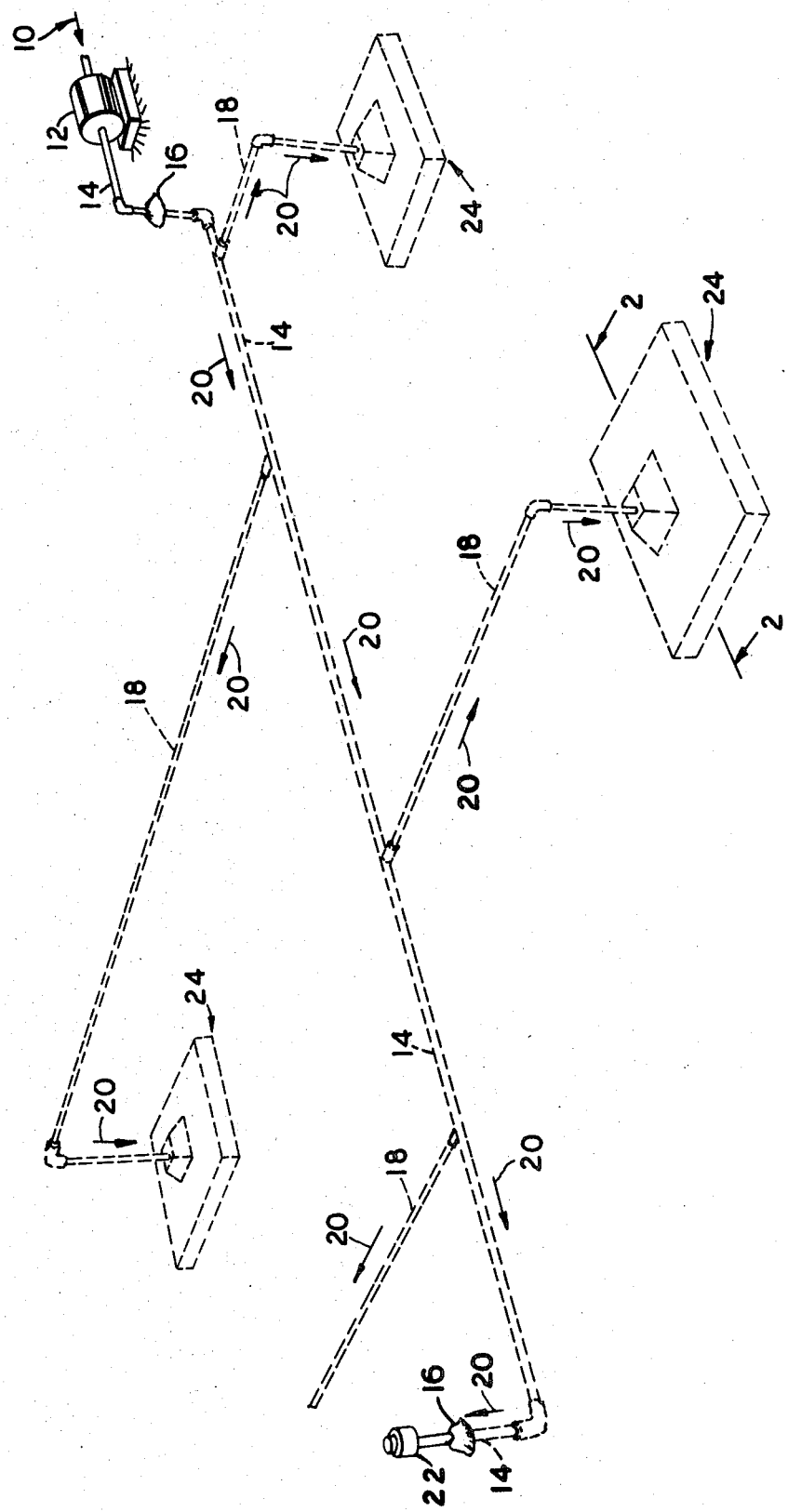
FIG. 1 is a schematic, somewhat diagramatic indication of a drip irrigation system embodying and for practicing this invention.

In FIG. 1 a water supply source is designated generally at 10 for supplying a system, in accordance herewith, with the water supply 10 feeding a pump 12 which in turn supplys water to main supply line 14. Arranged along main supply line 14 are a plurality of feeder lines 18 for feeding a supply of water to a plurality of water distribution arrangements designated generally 24. It should be understood, that it is within the purview of this invention that any number of feeder lines 18 may be arranged along main supply line 14 depending upon the size of the plot of land being irrigated. Moreover, the length of feeder lines 18 will depend upon the width of the plot of land being irrigated with those lengths varying, as shown in FIG. 1.

As shown further in FIG. 1, main supply line 14 exits from pump 12 above the surface 16 of the land with the rest of the system being below the surface of the land with the exception of bleeder valve 22 at the end of main supply line 14. Water is distributed in the directions of the arrows indicated as 20 in FIG. 1.

Figure 2:
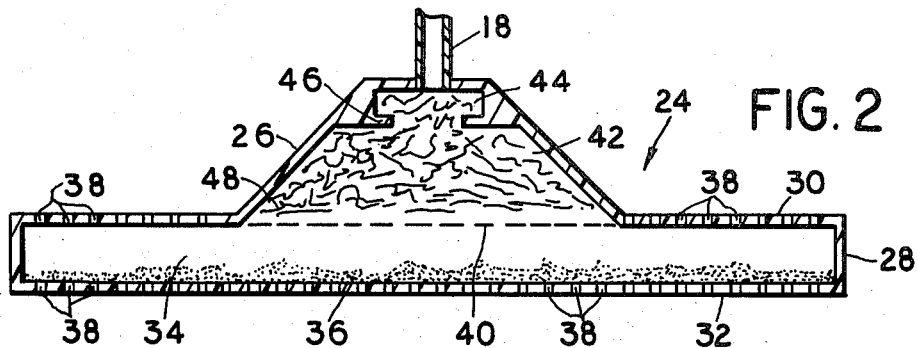
FIG. 2 is an elevational sectional view along lines 2—2 of FIG. 1 and showing one embodiment of a wick manifold and distributor attached to the supply line of the system, in accordance herewith.

Referring now to FIG. 2, a representative water distributor arrangement is shown connected to a feeder line 18 with the water distributor designated generally 24. Connected directly to the feeder line 18 is a wick manifold 22 which is shown as generally trapezoidal in shape in section in FIG. 2. It should be understood, however, that it is within the purview of this invention that wick manifolds 22 can be of a variety of shapes including a funnel shaped arrangement, with the only limitations being that the wick manifolds provide for appropriate control and distribution of water from feeder line 18 to its associated water distributor designated 28, which will be described in detail below.

In the embodiment shown in FIG. 2, wick manifold 26 is comprised of two chambers 42 and 44 divided by an annular baffle 46. Packed within chambers 42 and 44 of wick manifold 26 is a fibrous material which serves to hold, receive and distribute water in a slow incremental fashion for even distribution at the interface 40 between wick manifold 26 and distributor 28. The fibrous material 48 may be comprised of any material which serves to hold back excessive water and which will distribute water through the body thereof in an even incremental manner to distributor 28. Generally, the individual fibers will be hydrophobic. The fibrous material may be nylon yarn, for example, or some other plastic fibrous material such as polyester fiber generally, which will not be effected by or degrade in the presence of constant moisture. Disposed at interface 40 between wick manifold 26 and water distributor 28 is a foraminous divider for providing communication between chamber 42 of wick manifold 26 and chamber 34 of water distributor 28. This foraminous divider 40 merely serves to maintain the fibrous material 48 appropriately packed into chamber 42 and may be eliminated under certain circumstances, as described below.

Distributor 28 is comprised of upper and lower walls 30 and 32, respectively, which, again will be foraminous for the purpose of distributing water from distributor chamber 34 to the adjacent soil around distributor 28. In this connection, walls 30, 32 may be comprised of a plastic screening material or actual sheeting material having disposed therein a plurality of openings 38 for continuously distributing water from chamber 34 to the adjacent soil surface.

In the embodiment of FIG. 2, chamber 34 will have a quantity of hydrophillic material such as Hydrogel, for example, or Bentonite clay. As shown in FIG. 2, the material 36 is in its dry condition and does not fill chamber 34 because, for example, if Hydrogel is utilized, it expands upon coming into contact with water and will fill chamber 34 so as to carry water for even distribution to all of the bores 38 in walls 30, 32.

Figure 5:
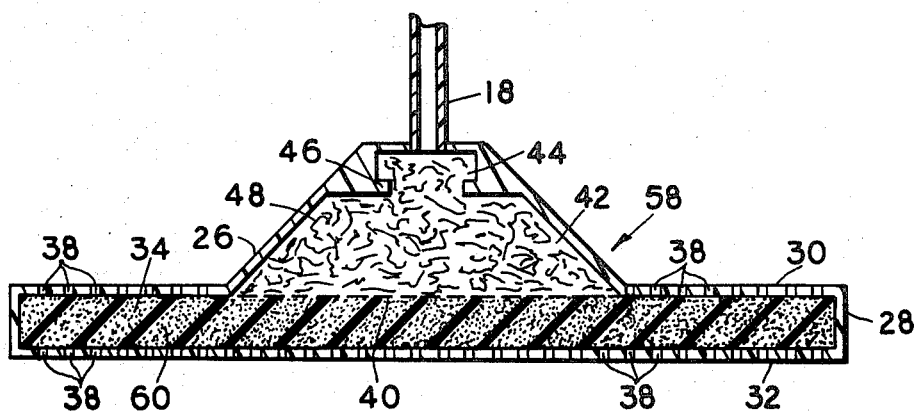
FIG. 5 is a sectional view of apparatus similar to that of FIG. 2, but showing a different embodiment of material utilized for the water distributor.

Referring now to FIG. 5, a further embodiment 58 of the individual distribution systems, in accordance herewith, is shown. In this embodiment, the fibrous material in the wick manifold 26, can be the same as that shown in the embodiment of FIG. 2. Furthermore, the rest of the arrangement as shown in FIG 2 will be the same except that a sponge like material 60 is shown disposed in chamber 34 of water distributor 28. Since the sponge material will not expand it is arranged to fill the entire chamber 34 for receiving water distributed thereto by the fibrous material 48 in wick manifold 26. In this arrangement, no foraminous divider is necessary at the interface 40 between the fibrous material 48 and the sponge material 60 because the sponge material will serve, itself, to maintain the fibrous material 48 appropriately packed into wick manifold 26.

Figure 4:
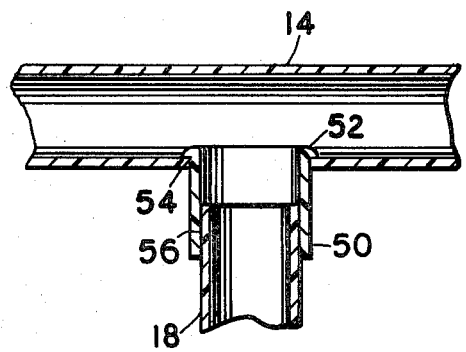
FIG. 4 is a sectional view of a representative arrangement of connection between the main supply line and the feeder lines of the system in accordance herewith.

Referring now to FIG. 4, one arrangement is shown for connecting the main supply line 14 to the plurality of feeder lines 18. In this connection, it should be understood that main supply line 14 and feeder lines 18 may be comprised of extruded thermoplastic material such as polypropylene, for example, all in well known manner. Main supply line 14 can then be drilled with a plurality of outlet bores 54 at appropriately spaced positions along supply line 14 depending upon the desired distribution points to be utilized in the particular irrigation system being arranged and depending upon the configuration of the plot of land being irrigated.

A thermoplastic annular collar 50 may be, for example, press fitted into each of bores 54 along supply line 14 with the thermoplastic collars 50 having annular beads 52 for securing the collars 50 into the bores 54. In conjunction with the press fit arrangement shown in FIG. 5, an appropriate adhesive may be utilized for further enhancing the seal between bore 54 and collar 50. Inserted into each collar 50 is an individual feeder line 18 to be connected at this point, with the interface 56 between the inner walls of collar 50 and the outer wall of feeder line 18 joined by an appropriate adhesive, all in well known manner.

Figure 3:
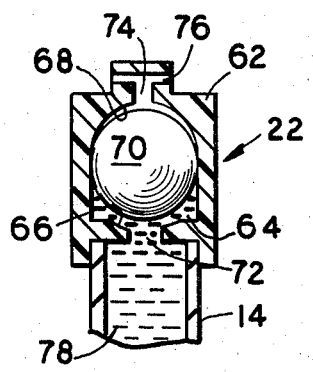
FIG. 3 is an elevational sectional view of the bleeder valve shown in FIG. 1.

Referring now to FIG. 3, a bleeder valve 22 is shown which is disposed, as shown in FIG. 1 at the end of the main supply line 14, and above ground. Bleeder valve 22 serves to bleed main supply line 14 of air and will automatically close upon a water supply reaching the chamber 64 of the bleeder valve. That is, bleeder valve 22 is comprised of a valve body 64, which again may be comprised of an extruded thermoplastic material, all in well known manner. Body 62 has a chamber 64 therein configured to provide a semi-circular annular bottom seat 66 and an annular top seat 68 for ball valve 70. When air is in main supply line 14 and chamber 64 of bleeder valve 22, ball valve 70 will be seated on its bottom seat 66 and air will bleed through passage 72 from main supply line 14 and force the ball valve 70 slightly from its seat whereupon the air will pass through chamber 64, passage 74 and a plurality of outlets 76 to the atmosphere. When water fills up main supply line 14 and passes through passage 72, it will float ball valve 70 and force it from seat 66 and against seat 68 thus closing passage 74. Thus, the line will be closed so that water 78 in main supply line 14 will not leak out of the bleeder valve 22.

Thus, as can be seen with the arrangements herein, water may be supplyed continuously to main supply line 14 and its associated feeder lines 18 in a relatively continuous manner because the wick manifolds 26 serve to receive and hold back the water pressure being supplied through the feeder lines 18 and to provide an even distribution of water in an incremental fashion to the water distributors 28. Water distributors 28, in turn, distribute the water in an even incremental manner on a more or less continuous basis to the adjacent soil. In this connection, it should be understood that water distributors 28, although shown as being substantially square in configuration may be of any shape including circular, rectangular and so forth, depending on the desired results to be achieved, the manufacturing requirements in a particular area, and so forth. With such an arrangement, no specific control is required with regard to time intervals with respect to and distribution of water through the system since it is operated on a semi-continuous manner and no complicated valving arrangements are required for maintaining control of the water pressure and even distribution throughout the system. The wick manifolds serve to hold back the water in the various feeder lines so that it is appropriately distributed over all of those feeder lines in the system regardless of reasonable variations in the elevation of individual ones of the distributors 24.

Thus, it can be seen that systems are provided, in accordance herewith utilizing parts which are relatively easily manufactured at comparatively low cost. Moreover, various parts can be easily combined together in relatively rustic circumstances without the need of expensive assemblying equipment. Furthermore, because of the particular arrangement herein, no expensive land leveling preparation is necessary since the systems, in accordance herewith, operate to meter the irrigating water along the supply lines therefor in relatively uniform amounts at area locations along the supply line regardless of reasonable variations in the elevation of any particular portion of the supply line or its distance from the upstream end of the system.

In addition, the arrangements herein are such that they can be operated in remote undeveloped areas where no mechanical power source is available. That is, because of the simplified arrangements herein, a manual pump may be utilized to supply the appropriate water pressure necessary for operating the systems in accordance herewith. Also, because of the relatively simple parts utilized herein all of the parts are readily replaceable and relatively little concern need be made for the problem of stoppage of appropriate irrigation from mineral deposits from the water in the system.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. In apparatus for irrigating land and having a source of water, a main supply line connected to said source, and a plurality of feeder lines in flow communication with said main supply line; the combination which comprises a wick manifold in flow communication with each of said plurality of feeder lines; a chamber in said manifold of gradually increasing cross-section from its respective feeder line; said manifold chamber being packed with a fibrous mass; a water distributor in flow communication with said wick manifold; said water distributor having a chamber containing hydrophilic means for receiving, storing and distributing water received from said wick manifold; and the walls of said water distributor being foraminous for the gradual transfer of water from said hydrophilic means through said walls.

2. Apparatus as recited in claim 1 in which said hydrophillic means in said water distributor chamber is selected from the group consisting of natural sponge, synthetic sponge, Bentonite clay and hydrogel.

3. Apparatus as recited in claim 1 in which a pump is disposed between said source and said main supply line for enhancing the movement of water from said source to said plurality of wick means.

4. Apparatus as recited in claim 1 which also includes an air bleeder valve at the end of said main supply line opposite said source, said valve being operative under air pressure in said main supply line to open and under water pressure in said main supply line to close.

5. Apparatus as recited in claim 1 in which said fibrous mass is Nylon fiber.

6. In apparatus for irrigating land and having a source of water, a main supply line connected to said source, and a plurality of feeder lines in flow communication with said main supply line; the combination which comprises a wick manifold connected to each of said plurality of feeder lines; each of said manifolds defining a chamber of gradually increasing cross-section from its respective feeder line; a hydrophobic fibrous mass packed into each of said wick manifold chambers; and hydrophillic water distribution means connected to each of said wick manifold chambers at the end thereof opposite said feeder for the gradual transfer of water from said water distribution means to adjacent soil.

7. Apparatus as recited in claim 6 which also includes a water distributor, the interior of which is in flow communication means with said wick manifold chamber; said hydrophillic water distribution means being disposed in said water distributor; and the walls of said water distributor being foraminous for the gradual transfer of water therethrough from said hydrophillic means.

8. Apparatus as recited in claim 7 in which said hydrophillic water distribution means is selected from the group consisting of natural sponge, synthetic sponge, Bentonite clay, and hydrogel.

9. A method for irrigating a plot of land; the steps which comprise placing a supply line over said land; filling said supply line with water; passing said water through a plurality of spaced apart masses of hydrophobic fibrous material; collecting water from each of said masses in a separate hydrophillic mass; and distributing the water collected from said collecting step incrementally to the adjacent soil of said plot surrounding each of said hydrophillic masses.

10. A method as recited in claim 9 in which said hydrophobic mass is selected from the group consisting of natural and synthetic fibers.

11. A method as recited in claim 9 in which said hydrophillic mass is selected from the group consisting of natural sponge, synthetic sponge, Bentonite clay and hydrogel.

* * * * *